US009818214B2

(12) United States Patent
Cincotti et al.

(10) Patent No.: US 9,818,214 B2
(45) Date of Patent: *Nov. 14, 2017

(54) SYSTEMS, PROCESSES, AND COMPUTER PROGRAM PRODUCTS FOR CREATING GEO-LOCATION-BASED VISUAL DESIGNS AND ARRANGEMENTS ORIGINATING FROM GEO-LOCATION-BASED IMAGERY

(71) Applicant: Military Wraps Research and Development, Inc., Raleigh, NC (US)

(72) Inventors: K. Dominic Cincotti, Wilmington, NC (US); Cathlena Ann Spencer, Wilmington, NC (US)

(73) Assignee: Military Wraps Research & Development, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/130,934

(22) Filed: Apr. 16, 2016

(65) Prior Publication Data

US 2016/0232697 A1  Aug. 11, 2016

Related U.S. Application Data

(63) Continuation of application No. 14/824,948, filed on Aug. 12, 2015, now Pat. No. 9,342,910, which is a (Continued)

(51) Int. Cl.
*G06K 9/54* (2006.01)
*G06T 11/60* (2006.01)
(Continued)

(52) U.S. Cl.
CPC ............ *G06T 11/60* (2013.01); *G06T 11/001* (2013.01); *H04N 1/00278* (2013.01);
(Continued)

(58) Field of Classification Search
CPC ........ G06T 11/60; G06T 11/001; G06T 11/40; G06T 2207/10024; H04N 1/00278;
(Continued)

(56) References Cited

U.S. PATENT DOCUMENTS 7,245,778 B2 * 7/2007 Anderson ............ H04N 1/4105
358/3.13
7,403,641 B2 * 7/2008 Nakamoto ........... G06K 9/6203
358/1.18
(Continued)

*Primary Examiner* — Yon Couso
(74) *Attorney, Agent, or Firm* — NK Patent Law, PLLC

(57) ABSTRACT

Systems, processes, and computer program products for creating visual designs and arrangements that originate from an image or images are provided. In particular, the present subject matter relates to systems, processes, and computer program products for taking captured images of an intended operating environment and creating visual designs that create visual confusion that can be utilized to disguise a recognizable form of a person or an object by breaking up its outline using portions, magnifications and distortions of a single captured image, portions, magnifications and distortions of multiple captured images, and/or disruptive patterns that can projected on an image screen or can be printed on a material.

20 Claims, 15 Drawing Sheets

Related U.S. Application Data continuation of application No. 13/654,406, filed on Oct. 17, 2012, now abandoned.

(60) Provisional application No. 61/548,083, filed on Oct. 17, 2011.

(51) Int. Cl.
*G06T 11/00* (2006.01)
*H04N 1/00* (2006.01)
*H04N 5/225* (2006.01)
*H04N 5/232* (2006.01)
*H04N 5/262* (2006.01)

(52) U.S. Cl.
CPC ....... *H04N 5/2257* (2013.01); *H04N 5/23293* (2013.01); *H04N 5/2621* (2013.01)

(58) Field of Classification Search
CPC ............. H04N 5/2257; H04N 5/23293; H04N 5/2621; H04N 19/0026; H04N 19/00315; F41H 3/00; F41H 5/00
USPC .......................................................... 382/302
See application file for complete search history.

(56) References Cited

U.S. PATENT DOCUMENTS

| | | | |
|---|---|---|---|
| 8,638,993 B2* | 1/2014 | Lee | G06K 9/00234 382/118 |
| 2007/0104383 A1* | 5/2007 | Jojic | G06T 7/2006 382/254 |
| 2011/0151191 A1* | 6/2011 | Cincotti | F41H 3/02 428/143 |
| 2013/0114876 A1* | 5/2013 | Rudaz | H04N 1/32203 382/135 |

\* cited by examiner

SYSTEMS, PROCESSES, AND COMPUTER PROGRAM PRODUCTS FOR CREATING GEO-LOCATION-BASED VISUAL DESIGNS AND ARRANGEMENTS ORIGINATING FROM GEO-LOCATION-BASED IMAGERY

RELATED APPLICATIONS

This application is a continuation of U.S. patent application Ser. No. 14/824,948 filed on Aug. 12, 2015, which claims priority to U.S. patent application Ser. No. 13/654, 406 filed on Oct. 17, 2012, which claims priority to U.S. Provisional Patent Application Ser. No. 61/548,083, filed Oct. 17, 2012, the entire contents of all of which are hereby incorporated by reference herein.

TECHNICAL FIELD

The subject matter disclosed herein relates to systems, processes, and computer program products for creating visual designs and arrangements that originate from an image or images. In particular, the present subject matter relates to systems, processes, and computer program products for taking captured images of an intended operating environment and creating visual designs that create visual confusion that can be utilized to disguise a recognizable form of a person or an object by breaking up its outline portions, magnifications and distortions of a single captured image, portions, magnifications and distortions of multiple captured images, and/or disruptive patterns that can be projected on an image screen or can be printed on a material.

SUMMARY

The subject matter disclosed herein relates to systems, processes, and computer program products for creating visual designs, such as camouflage patterns or the like, that originate from an image or images from a video stream made by a mobile device at a specific location where a desired camouflage pattern is need, for example, at a site where a mission for military personnel or law enforcement personnel is to be carried out. Additionally, such system, processes, and computer program products can be used to create camouflage for use for recreational purposes, such as hunting. The image or images that are taken from a mobile device in a specific location can be taken to create camouflage patterns that are then printed on fabrics for clothing, tape and/or plastic film for wrapping weapons and equipment, netting for coverage, or the like.

For example, the present subject matter relates to systems, processes, and computer program products for taking images captured by mobile devices, smart phones, smart cameras, or the like and creating visual designs that create visual confusion that can be utilized to disguise the recognizable form of an object by breaking up its outline using unnatural magnifications and distortions of the photo-image and disruptive patterns that can be projected on an image screen or can be printed on a material, such a vinyl wrapping, fabrics, garments, metal siding, or the like.

In some embodiments, the present subject matter can comprise an application that can be downloaded and used on a mobile device, for example, a smart phone or a mobile tablet device. The user can capture one or more images through a camera device on the mobile device that can be a portion of a video or one or more photographs. Using the application that has been downloaded on the mobile device, the user can create a visual design and/or arrangement, such as one or more camouflage patterns. In one aspect, a site-specific photographic image or images taken by the camera device on the mobile device can be manipulated by adding one or more disruptive patterns thereto to achieve a disruptive effect that aids in the cause of visual confusion by inhibiting normal depth perception. The disruptive pattern can contain one or more colors. Alternatively, the disruptive patterns can include the positioning of images or sections having different focal lengths layered over a site-specific photographic image. Further, the camouflage pattern can be a plurality of disruptive patterns with each disruptive pattern including an image with a different focal length. These processes can disrupt the normal environment of the site-specific photographic images to disrupt vision rather than attempting to create a camouflage pattern or arrangement to match the photographic image. The type of disruptive patterns that can be used can be selected in the application on the mobile device by the user.

The application can then be used to forward the design to a facility that can print, for example, digitally print the camouflage pattern or patterns on a fabric, vinyl film wrapping, garment, or the like. In some embodiments, a fabric on which the camouflage pattern can be used to construct one or more garments or equipment articles, such as backpacks. The application can be used to provide payment and shipping information for shipping/transporting the finished items to an intended recipient, which can be the user of the mobile device.

The subject matter described herein may be implemented in software, in combination with hardware and/or firmware. For example, the subject matter described herein may be implemented in software executed by a hardware-enabled processor. In one exemplary implementation, the subject matter described herein of creating geo-location-based visual designs and arrangements originating from video stream may be implemented using a non-transitory computer readable medium having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures, in which.

DETAILED DESCRIPTION

Figure 1:
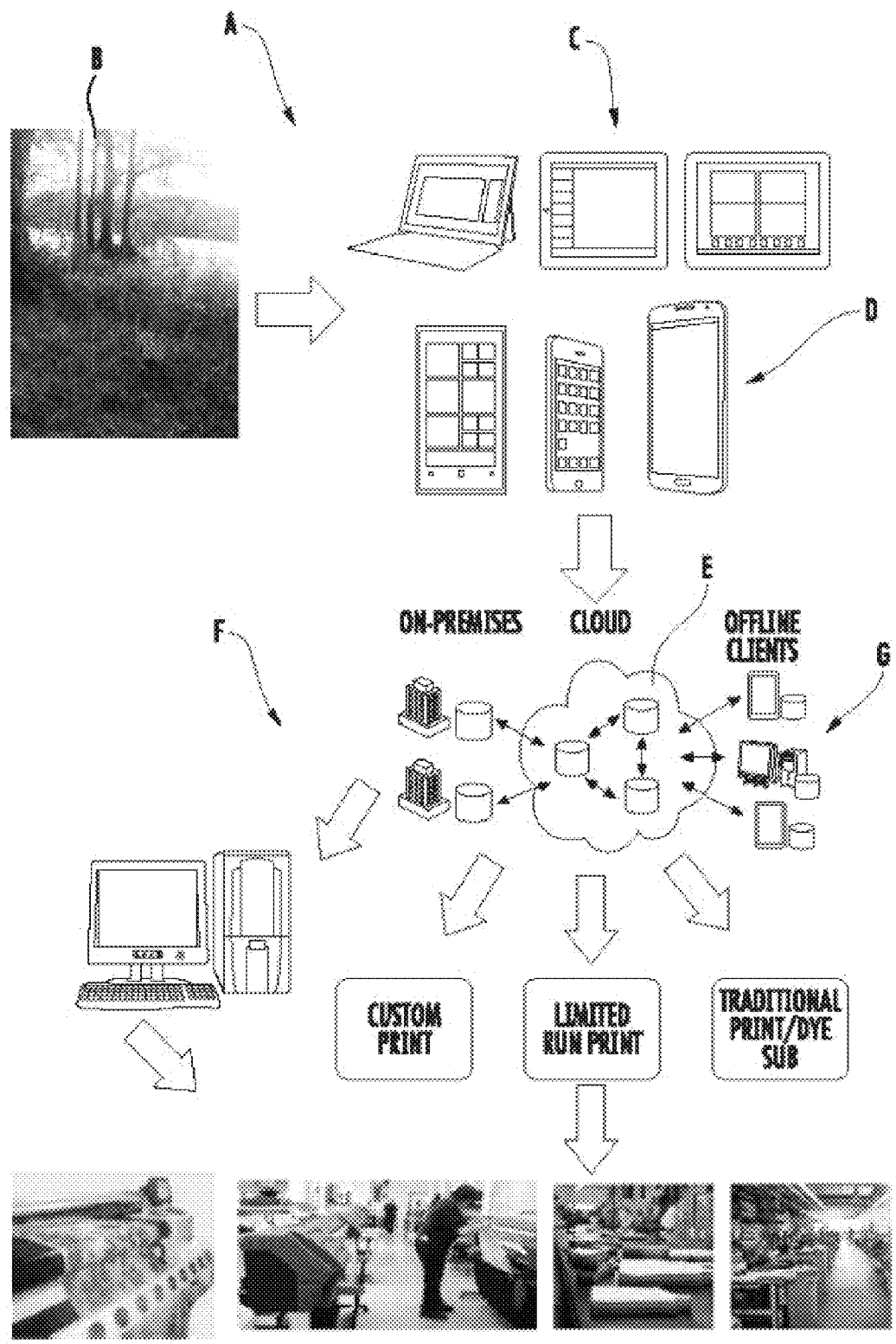
FIG. 1 illustrates an embodiment of one or more systems for creating a site-specific, or a geo-location based, camouflage pattern and possible applications of the camouflage pattern according the subject matter disclosed herein.

Reference will now be made in detail to the description of the present subject matter, one or more examples of which are shown in the figures. Each example is provided to explain the subject matter and not as a limitation. In fact, features illustrated or described as part of one embodiment may be used in another embodiment to yield still a further embodiment. It is intended that the present subject matter cover such modifications and variations.

"Site-specific" as used herein means a specific local terrain, nautical position, or airspace where a physical item will be located or operating, or the environmental characteristics which would be found in the intended operating environment of the physical item.

"Intended operating environment" as used herein means the location or region where a camouflage pattern being designed is planned or intended to be used.

"Dispersal" or "dispersal pattern" as used herein refers to a pattern of shapes that when configured on an image will cause visual confusion. For example, "dispersal" or "dispersal pattern" can refer to the boundaries that outline the shapes of different component, or dispersal mask templates, that are used to create a camouflage pattern when the dispersal mask template layers are occupied by different imagery or color that inhibits or disrupts the recognition or identification of a person or an object by disguising its form. As an example, but not as a limitation, a dispersal pattern can comprise a series of dispersal mask template layers that comprise images or subsection portions of images of an intended operating environment.

"Dispersal mask template" or "dispersal mask template layer" as used herein means a specific layer of a dispersal pattern that is to have the portions of the same image or same color therein. When multiple dispersal mask template layer of a dispersal pattern are filled with different imagery and colors a camouflage pattern can be created that disrupts or inhibits the recognition or identification of a person or an object by disguising its form.

"Distortions," "distorting," and variations thereof as used herein means the changing of at least a portion of an image by manipulating the focal lengths within those portions of the image, adding to a first image a portion of the image or a portion of different image that has a different focal length than the first image, or adding shapes of color that change the appearance of the image. Focal lengths can include improper focal lengths that cause at least a portion of the image to appear to be out of focus.

"Image editing program" as used herein means a computer program used to edit or change an image. Examples include Adobe PHOTOSHOP®, PAINT.NET® and PICASA®.

"Image" as used herein means the optical counterpart of an object or environment produced by a device (such as a computer, an optical device, electromechanical device or electronic device, a mobile smart device) or a combination of devices thereof. As used herein, "image" can be used to refer to a whole image, for example, a digital photographic image as taken by a photographic device, or a portion thereof.

"Dispersal mask" as used herein means

"Quantize colors" as used herein means using computer graphic, color quantization or color image quantization and is a process that reduces the number of distinct colors used in an image, with the intention that the new image should be as visually similar as possible to the original image.

"Milspec color" or "milspec colors" as used herein means a federal Standard 595 Color Swatch selection color range system.

"Smart device," or "mobile smart device," as used herein means any mobile electronic device configured with imaging, and computing capabilities that can process image data. Such smart devices can include, but are not limited to, at least one of a mobile smartphone, a personal digital assistant (PDA), a computing tablet, some digital cameras or video recorders, or any like mobile electronic device configured with imaging and computing capabilities. In some embodiments, the smart device may be provisioned with a hardware-based processor that is configured to execute software programs or applications.

"Mobile smart device software application" as used herein means specific software applications for and used on a mobile smart device that can be in the form of a non-transitory computer readable medium comprising computer executable instructions embodied in a computer readable medium that when executed by a processor of a computer control of the smart device, the smart device can perform specific steps.

"Software application" as used herein means software applications for and used on a computer, which can include, but is not limited to a mobile smart device, that can be in the form of a non-transitory computer readable medium comprising computer executable instructions embodied in a computer readable medium that when executed by a processor of a computer control of the computer, the computer can perform specific steps.

The subject matter disclosed herein relates to systems, processes, and computer program products for creating visual designs, such as camouflage patterns or the like, that originate from an image or images from a video stream made by a mobile device at a specific location where a desired camouflage pattern is need, for example, at a site where a mission for military personnel or law enforcement personnel is to be carried out. Additionally, such systems, processes, and computer program products can be used to create camouflage for use for recreational purposes, such as hunting. The image or images that are taken from a mobile device in a specific location can be taken to create camouflage patterns that are then printed on fabrics for clothing, tape, vinyl film, or coverings for wrapping weapons and equipment, netting for coverage, or the like.

For example, the present subject matter relates to systems, processes, and computer program products for taking images captured by mobile devices, smart phones, smart cameras, or the like and creating visual designs that create visual confusion that can be utilized to disguise the recognizable form of an object by breaking up its outline using unnatural magnifications and distortions of the photo-image and disruptive patterns that can projected on an image screen or can be printed on a material, such a vinyl wrappings, tapes, fabrics, garments, metal siding, or the like.

In some embodiments, the present subject matter can comprise a software application that can be downloaded and used on a mobile smart device, for example, a smart phone or a mobile tablet device. The user can capture one or more images through a camera device on the mobile device that can be a portion of a video or one or more photographs. Using the application that has been downloaded on the mobile device, the user can create a visual design and/or arrangement, such as one or more camouflage patterns. In one aspect, a site-specific photographic image or images taken by the camera device on the mobile device can be manipulated by adding one or more disruptive patterns thereto to achieve a disruptive effect that aids in creating visual confusion by inhibiting normal depth perception. The disruptive patterns can contain one or more colors. Alternatively, the disruptive patterns can include the positioning of images or sections having different focal lengths or different images from within the intended operating environment layered over or with another intended operating environment image. Further, the camouflage pattern can be a plurality of disruptive patterns with each disruptive pattern including an image from within the intended operating environment. These processes can disrupt the normal environment of the site-specific photographic images to disrupt vision rather than attempting to create a camouflage pattern or arrangement to match the photographic image. The type of disruptive patterns that can be used can be selected in the application on the mobile device by the user.

The application can then be used to forward the design to a facility that can print, for example, digitally print, the camouflage pattern or patterns on a fabric, vinyl film wrapping, garment, or the like. In some embodiments, a fabric on which the camouflage pattern is printed can be used to construct one or more garments or equipment articles, such as backpacks. The application can be used to provide payment information and shipping information for shipping/transporting the finished items to an intended recipient, which can be the user of the mobile device, for example.

In particular, the subject matter disclosed herein provides an approach to camouflage, concealment & deception, decoy ("CCD2") that can be a geo-location based, camera-derived camouflage. The camouflage created by this geo-location based, camera-derivation can be digitally printed onto fabrics, netting, plastic films, such as vinyl films, metal sheeting, tapes, etc. For example, the camouflage can be digitally printed on fabrics that can be used to make garments and/or coverings. In some embodiments, for instance, the camouflage can be digitally printed directly onto pre-treated fabrics intended for direct to fabric printing. This refers to both fabrics that are intended to work with digital printing and have a surface pre-treatment to accept the ink and also to traditional fabrics and textiles that can be surface treated to allow digital printing thereon. Custom garments, coverings, or other accessories can then be manufactured in a just-in-time fashion from such fabrics. These garments coverings, or other accessories can be intended for this same specific, geo-coordinated operating environment from which the imagery was captured.

Visually adaptive geo-coordinated camouflage is an emerging field of military camouflage (for vehicles, manned and unmanned, land, sea, or air, hardware equipment, weapons, structures). The present disclosure provides away to take geo-location based camouflage, whether for direct digital printing onto fabric or for electronic display (using OLED, PHOLED, E-INK, AMOLED, etc.), and produce dispersal patterns from the video stream or images that have been or are being captured.

The processes and methods described herein can make possible imagery blending and the use of dispersals that inhibit shape recognition by breaking up the recognizable form under the camouflage. The imagery used can be captured by mobile smart device, such as Examples of camouflage that can be created include:

geo-location based camouflage, which is camouflage that is based on imagery from a specific location produced from video stream or photographic images;

geo-location based camouflage produced from HD video stream;

geo-location based camouflage produced to be later displayed in a medium on an electronic device (OLED, PHOLED, AMOLED, etc.); and geo-location based camouflage based on a dispersal pattern selected from a plurality of dispersal patterns.

Such patterns can be intended for display on OLED, PHOLED, E-INK, AMOLED displays or screens.

In some embodiments of the processes and systems, digitally printed media such as woven, knitted, and/or nonwoven fabrics, netting, can be pre-treated with a flame retardant and used for direct digital/direct to garment printing for custom, just-in-time manufacturing. Digitally printed media such as woven, knitted, and/or nonwoven fabrics, wicking fabrics, mesh, or the like, can be pre-treated with a flame retardant and used for direct digital/direct to garment printing for custom, just-in-time manufacturing. Woven, knitted, or nonwoven covers can include body armor. Visually adaptive display coverings can also include body armor, for example, when using OLEO, PHOLED, AMOLED, or the like as part of the body armor. Geospatial intelligence camouflage, for example, such as GEOINT Camouflage™ provided by Military Wraps Research and Development, Inc. of Lumberton, N.C., can be used to provide an adaptive electronic display that can provide constantly updated imagery from one or more camera systems or mobile smart devices.

Referring to FIG. 1, an embodiment of one system, generally A, that can include multiple subsystems for creating a camouflage pattern that is based on an intended operating environment and producing camouflaged goods using that camouflage pattern is provided. Geo-Specific Environment, or intended operating environment B, begins as the basis for obtaining a geo-location based camouflage pattern that can be used on a variety of goods. Any of a variety of mobile smart devices, such as tablet devices C, smartphones D, or smart cameras (not shown), for example, can be used to take images, such as photographic images, of the intended operating environment B and that can associate a geo-location or geo-coordinates to the respective images of the intended operating environment B. These mobile smart devices can then generate a geo-specific camouflage pattern based on the image or images of the intended operating environment B. That geo-specific camouflage pattern can then be sent via the respective mobile smart device over a network E to a cloud data base or on-site production facility, generally designated F. The camouflage pattern can be used to produce custom one run items in some embodiments at a production facility F. For example, in some cases, these patterns can be sent to a computer for digital preparation for printing onto films and fabrics. In other cases, the camouflage patterns have already been prepared for print via software on the originating devices.

These camouflage patterns can also be compiled and stored in a database to create a library of user generated camouflage patterns from different intended operating environments. Other users G can access the library to obtain camouflage of a specific intended operating environment. These users can, in some instance, have the ability to choose from a plurality of camouflage patterns from same or similar intended operating environment. The library of camouflage patterns can also be used to identify the most popular or effective camouflage based on user ratings or preferences to identify camouflage patterns for use large scale commercial production of goods.

The goods on which the camouflage pattern can be printed can comprise any suitable substrate. The printing technology used can be any suitable printing technology such as digital printing, dye sublimation, or hydrographic printing. Hydrographics, also known as immersion printing, water transfer printing, water transfer imaging, cubic printing, or hydro dipping, is a method of applying printed designs to three-dimensional objects. The hydrographic process can be used on metal, plastic, glass, hard woods, and various other materials. In the process, the substrate piece to be printed is pre-treated and a base coat material is applied. A polyvinyl alcohol film is gravure-printed with the graphic image to be transferred, and is then floated on the surface of a vat of water. An activator chemical is sprayed on the film to dissolve it into a liquid and activate a bonding agent. The piece is then lowered into the vat, through the floating ink layer, which wraps around and adheres to it. After removing the piece from the water, a top coat is applied to protect the design. With multiple dippings, hydrographics printing can achieve full 360° coverage of the part surface, including small crevices.

According to the present subject matter, a software application can be employed to form a camouflage, such as a geospatial intelligence camouflage, that can be created using a photographic image or video stream and a dispersal pattern that can allow selection of one or more dispersal mask templates based on coordination of environment shapes and template shapes (for example, right angles and blocks in urban setting, tree like shapes in wooded areas, etc.). The software application can be employed to form patterns and arrangements for digitally printed or digitally displayed adaptive camouflage that can comprise, along with imagery, geo-coordinates such as longitude, latitude, elevation, etc., that can be captured along with visual imagery. Dispersal patterns that can be used to produce a camouflage can have dispersal mask template layer that are occupied by photographic images take, for example, advantage of differing focal lengths of the respective images taken in proximity to each other or of subsection portions of different images from the intended operating environment to confound recognition and inhibit perceptual depth clues.

For example, in some embodiments, a software application, which can be used on a mobile smart device, can be employed to use a video stream (which can be High Definition) and dispersal mask template layers of dispersal pattern to capture photo-subsections of the video stream to produce precise camouflage which is intended for a location based on geographic coordinates. These coordinates can include longitude, latitude, elevation and bearing. Below is one example embodiment of steps of using a software application on a mobile device. In particular, a mobile smart device software application on the mobile smart device in the form of a non-transitory computer readable medium comprising computer executable instructions embodied in a computer readable medium that when executed by a processor of a computer control the computer, such as the mobile smart device, can perform steps such as the following. While the software applications are described as a mobile smart device software application, other types of computing devices such as personal computer can be use some embodiments of the software applications.

Figure 2B:
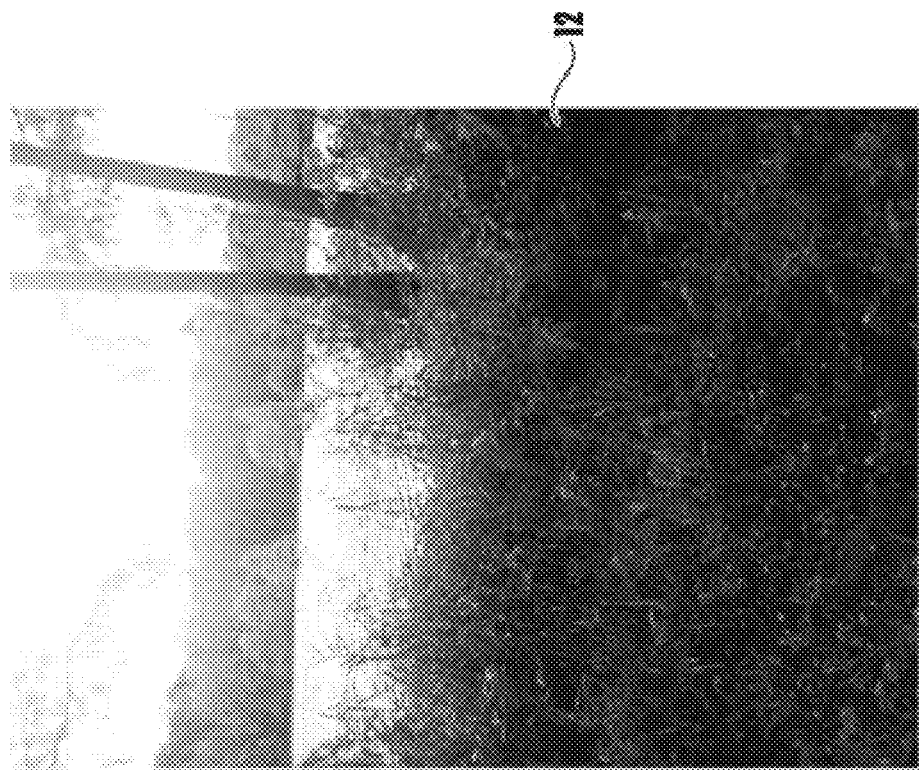
FIGS. 2A-2C illustrate embodiments of images that can be taken by a camera device on a mobile smart device, such as a smart camera, a tablet device or a smartphone, for example, for an intended operating environment, which can be identified by a GPS location providing a longitude and a latitude for the intended operating environment for use in embodiments of systems, processes, or computer program products according the subject matter disclosed herein.
Figure 2A:
Figure 3:
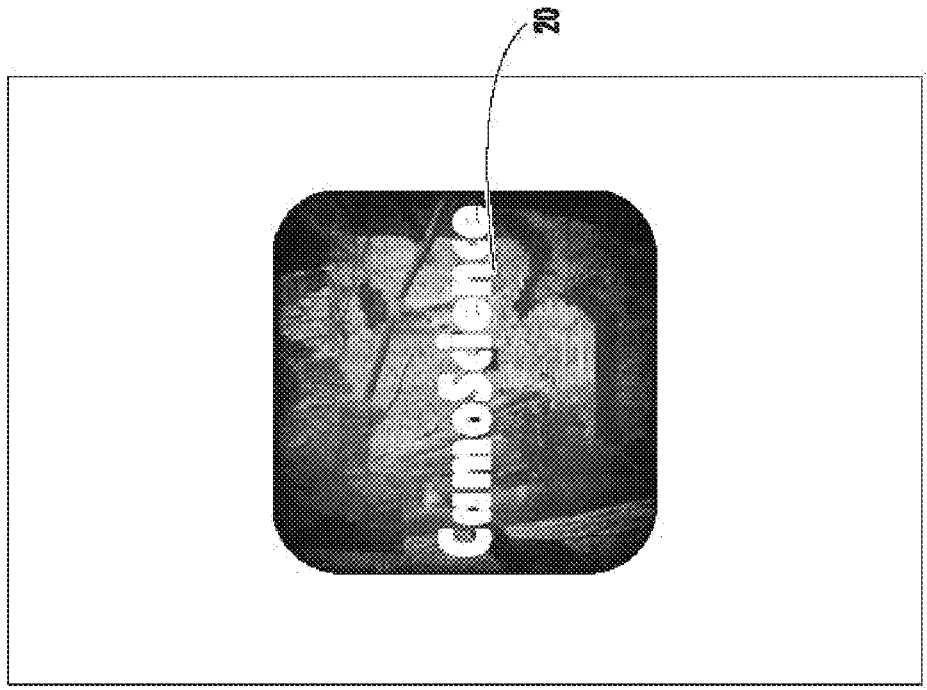
FIG. 3 illustrates an embodiment of an icon that can be used to start a software application, for example on a computer or mobile smart device that is used to create a camouflage pattern according the subject matter disclosed herein.
Figure 2C:
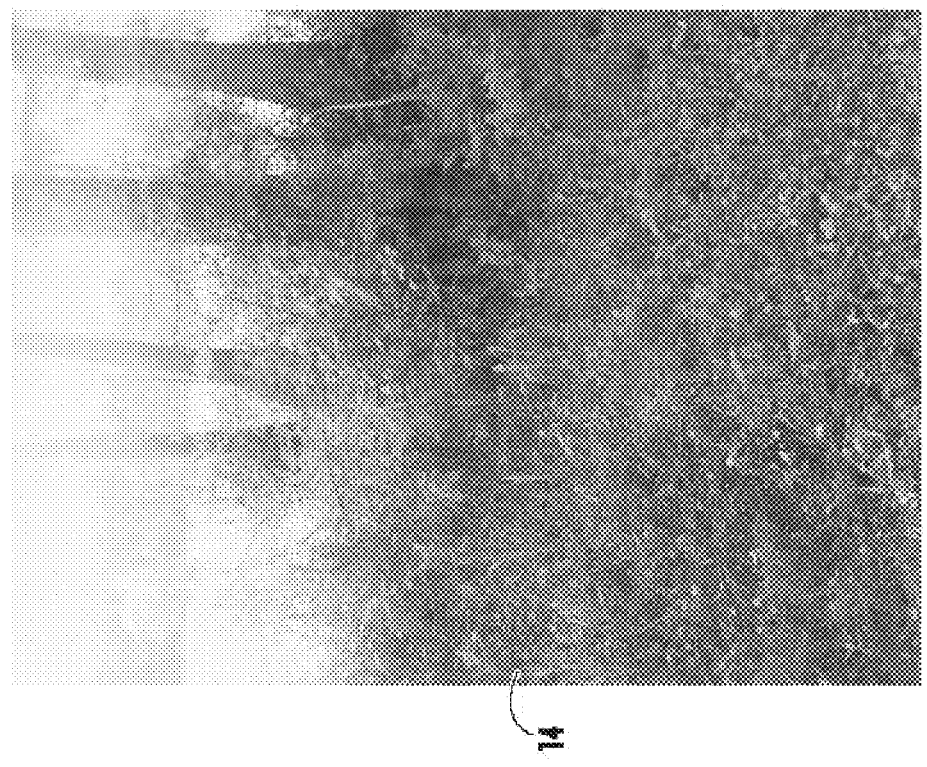

After being downloaded onto a mobile smart device, a software application, or module, can be activated or launched to create a camouflage pattern from images taken in the intended operating environment by pressing an icon 20 as shown in FIG. 3. Using one or more images from an intended operating environment, such as images 10, 12, 14 as shown in FIG. 2A-2C, a site-specific, i.e., a geo-location based camouflage pattern can be created. As stated above, while described with reference to a software application on a mobile smart device, the general application of processing a captured image to occupy a dispersal mask template layer of a dispersal pattern that comprises multiple dispersal mask template layers, and occupying the other layers of the multiple dispersal mask template layers of the dispersal pattern to form a camouflage pattern can be performed on other types of computers, such as personal computers or mainframe or networked computers, for example.

Figure 4:
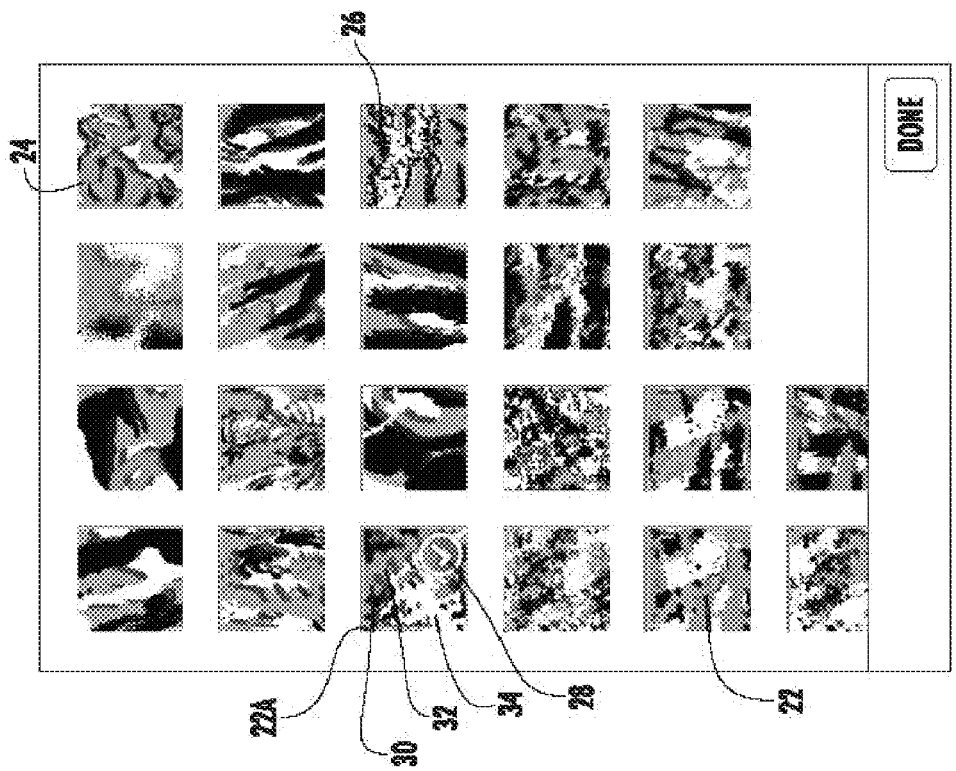
FIG. 4 illustrates an embodiment of a screen shot of a pattern, or dispersal pattern, selection page in the software application according to FIG. 3 that can be used to select a dispersal pattern for creating a pattern of camouflage from an image or images with the dispersal pattern being capable of being selected by the user and an indication of the selection being provided by an icon, such as a circled check.

FIG. 4 illustrates an embodiment of a screen shot of dispersal pattern selection page in the application on the mobile smart device that can be used to select a dispersal pattern 22A from a plurality of dispersal patterns 22, 24, 26 by a touch of the user that is the user's preference for the intended camouflage pattern design and/or based on the features of the intended operating environment. An indication of the selection can be provided by an icon, such as a circled check 28. Each dispersal pattern, such as template 22A in FIG. 4, can have multiple dispersal mask template layers 30, 32, 34 that can each be used to add distorting and/or disruptive features to the camouflage pattern being created when the multiple layers 30, 32, 34 are combined. Images of the intended operating environment, such as images 10, 12, 14 in FIGS. 2A-2C, can be selected to occupy respective multiple layers 30, 32, 34 of selected dispersal pattern 22A to facilitate creation of the camouflage pattern.

In some embodiments, images of an intended operating environment, such as images 10, 12, 14 in FIGS. 2A-2C, can be select from previously captured images. In some embodiments, images, such as 10, 12, 14 in FIGS. 2A-2C, can be captured by the mobile smart device being used to generate the camouflage pattern. For example, the mobile smart device can be held so that the image taking device on the mobile smart device, such as a camera device thereon, is "pointed" in the direction of the intended operating environment. An image or series of images can then be captured by initiating the image taking device on the mobile smart device. For example, the initiation of the image taking device can be accomplished by pressing a camera button, or icon, on the mobile smart device. On a smart camera, the initiation of the image taking device can be accomplished by pressing of the shutter button.

Figure 5:
FIG. 5 illustrates an embodiment of a screen shot comprising a view of an image after selection of the dispersal pattern according to FIG. 4 with a shadow (i.e., outline) of the intended dispersal pattern over the original image using the software application according to subject matter disclosed herein.
Figure 6:
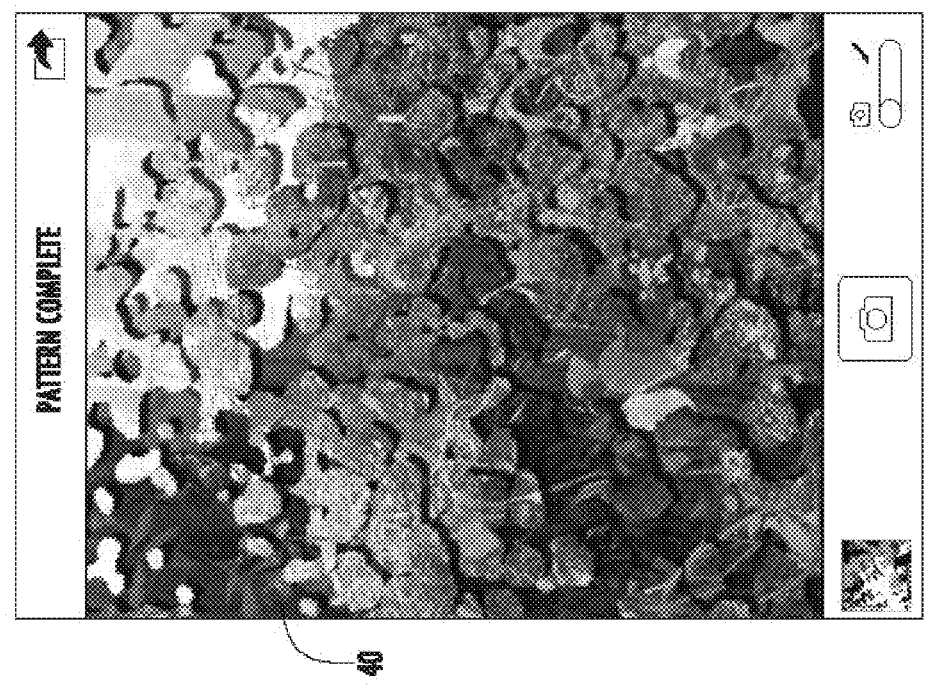
FIG. 6 illustrates an embodiment of a completed camouflage pattern using the systems, processes, and computer program products according the present subject matter with the dispersal mask template layers of the dispersal pattern according to FIGS. 4 and 5 occupied by subsection portions of the images of FIGS. 2A-2B.

FIG. 5 illustrates a screen snot showing a portion of image 14 after selection of the dispersal pattern according to FIG. 4 with a shadow (i.e., outline) of the intended dispersal pattern over the original image 14. The portion of image 14 can serve as a dispersal mask template layer and can be processed to occupy that dispersal mask template layer. In some embodiments, the dispersal pattern shadow can serve as a view finder to optimize the image being used. As shown in FIG. 6, other images 12, 14 can be used to occupy other dispersal mask template layers until a camouflage pattern 40 is completed. In some embodiments, each dispersal layer can be chosen and captured through the shadow view finder so that the camouflage pattern builds in with each new captured image occupying one of the dispersal mask template layers of the chosen dispersal pattern. Thereby, the shadow outline that serves as a view finder operates as a diminishing view finder as each newly captured image occupies one of the dispersal mask template layers.

Thus, this newly created first dispersal mask layer can be processed and displayed in the viewfinder or screen of the mobile smart device. Next, the image taking device on the mobile smart device can be pointed or moved to another area within the intended operating environment to create an image that mobile smart device software application can use to form a second dispersal mask template layer. Alternatively, the device or camera can be adjusted to a different focal length to create an image of the same general area that mobile smart device software application can use to form such a photo subsection that is used as a second layer of the dispersal mask. Subsequent dispersal mask layers can be formed by the image taking device on the mobile smart device in a similar manner as described above with respect to the first and second layers until "a pattern is complete" with subsection portions from the subsequent images or video stream filling each. In this manner, later producing steps can then be repeated for creating additional photo subsections for other layers within the camouflage pattern design to provide a new created camouflage pattern.

Figure 7:
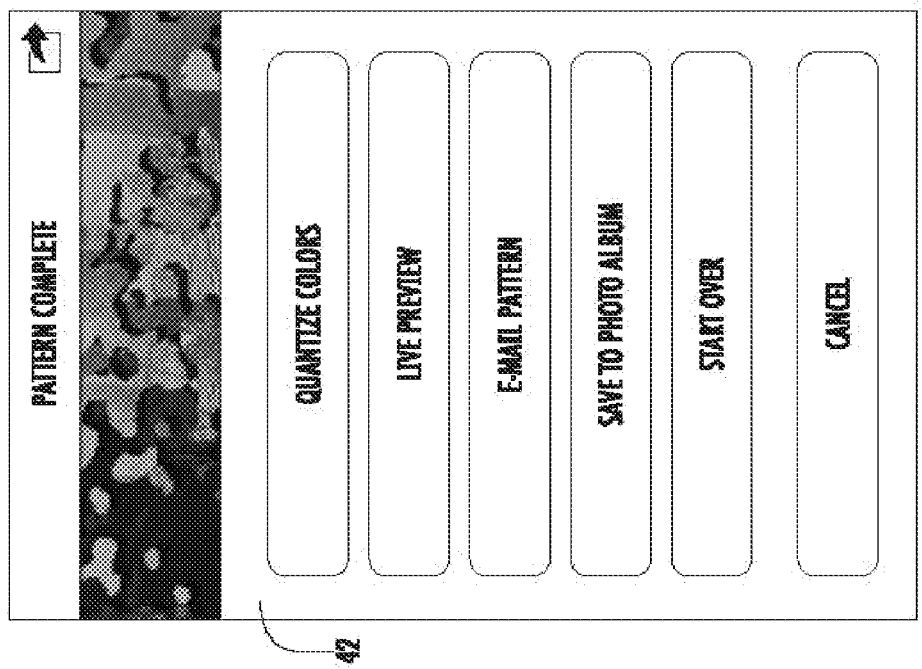
FIG. 7 illustrates an embodiment of a screen shot of a display of feature buttons in the software application according to subject matter disclosed herein that can be selected to preview and finalize the completed pattern according to subject matter disclosed herein.

After a camouflage pattern is completed an options button display 42 can be activated as shown in FIG. 7. In some embodiments, the mobile smart device software application can then shift the entire newly created camouflage design or at a portion thereof into a color range system such as milspec color range system of milspec colors through selecting the "quantize colors" feature button feature on display 42 in the mobile smart device software application on the mobile device as shown in FIG. 7. In particular, colors that are closest to a milspec color are replaced in the camouflage with that milspec color. In this manner, military camouflage and, in some cases, more printer friendly camouflage can be created from the intended operating environment.

Figure 8:
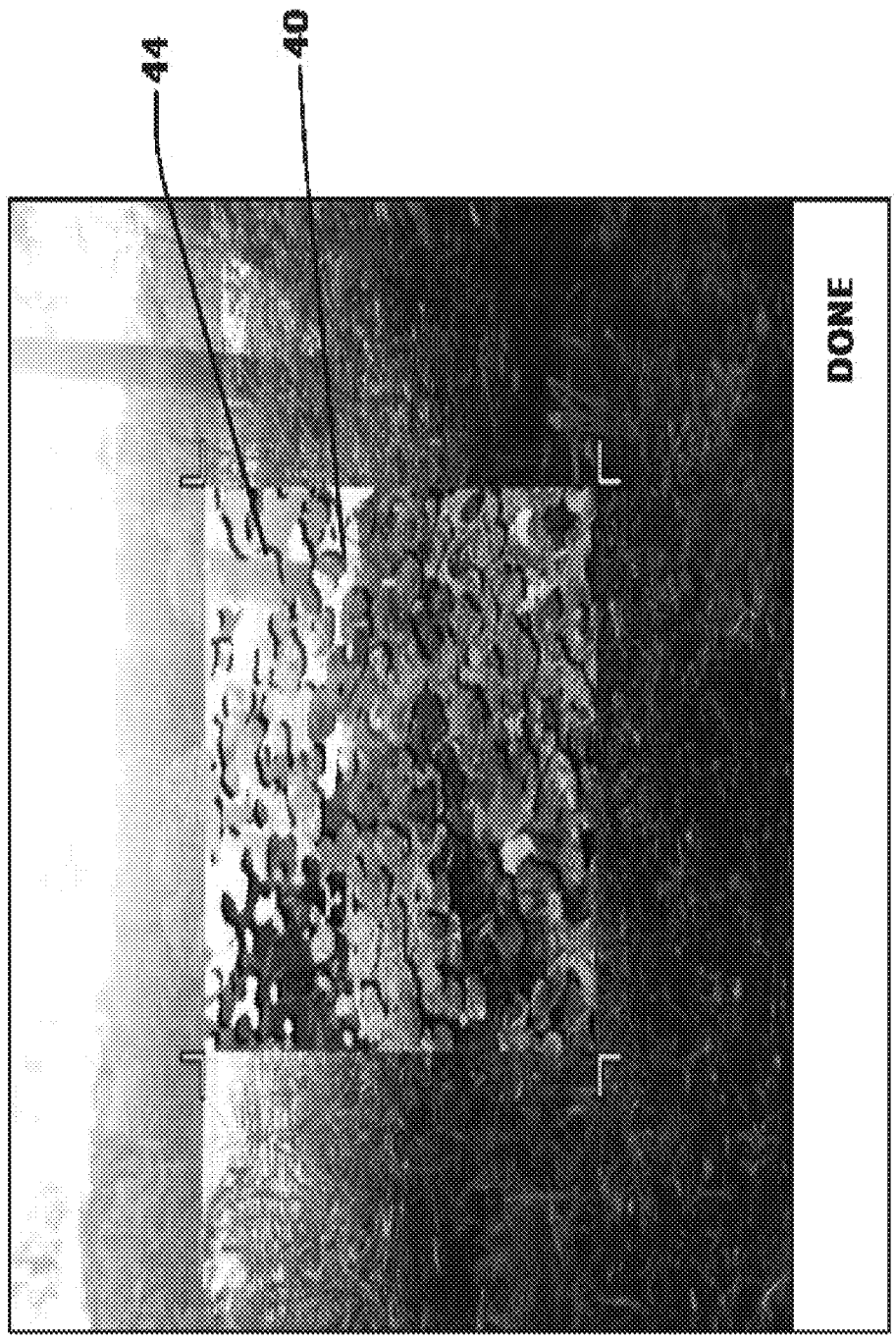
FIGS. 8-10 illustrate the completed camouflage design according to FIG. 6 in the "Live Preview" feature from activation of the "Live Preview" button shown against FIG. 7 in different areas within the operating environments.
Figure 9:
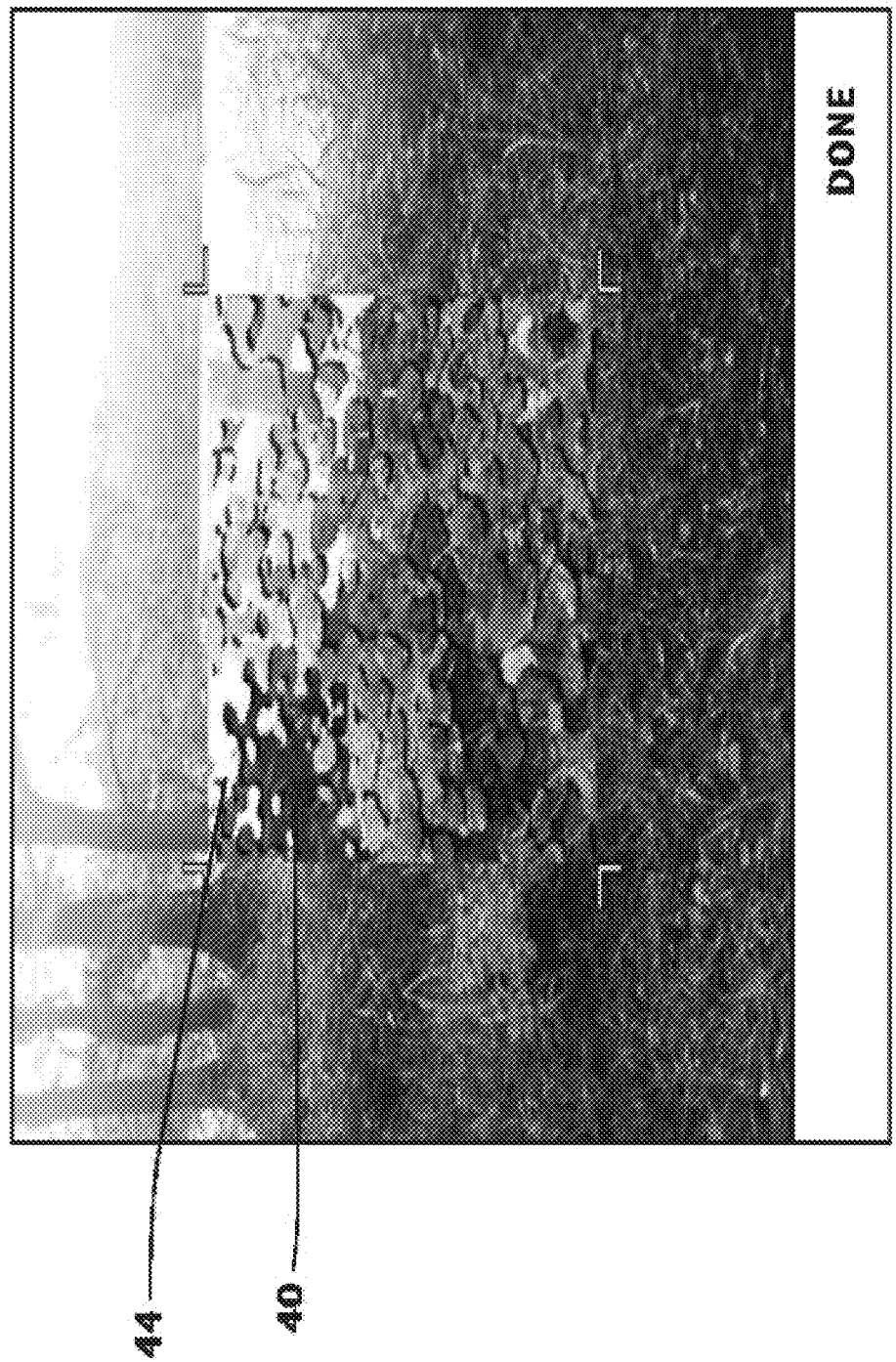
Figure 10:
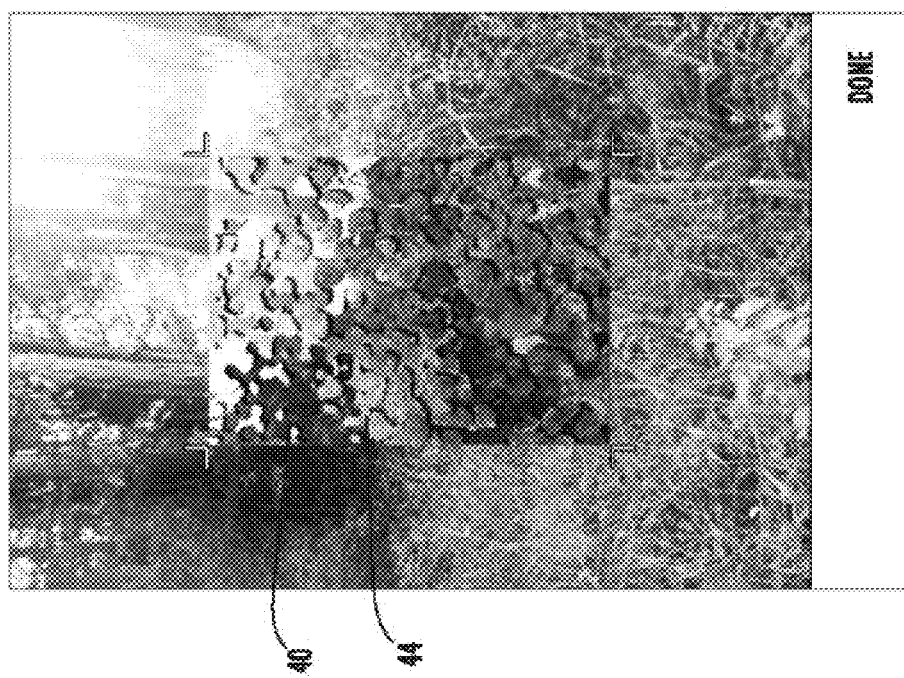

The mobile smart device software application can include an augmented reality function. Using the augmented reality function, labeled as "Live Preview" on display 42 as shown in FIG. 7, the intended newly created camouflage design can be displayed onto the viewfinder of the mobile device to test how well it works as shown in FIGS. 8-10. To confirm the camouflage patterns effectiveness or usefulness, the mobile smart device software application can display on the mobile smart device a design thumbnail 44 of the newly created camouflage pattern 40 against a live or recorded image or video steam through the (as shown in FIGS. 8-10). Using the image taking device on the mobile smart device, the mobile smart device can then be pointed into multiple areas of the intended operating environment for comparison. If necessary, a user can select the start over feature (as shown in FIG. 7), if the user wishes to improve the newly created camouflage pattern or design.

Figure 13:
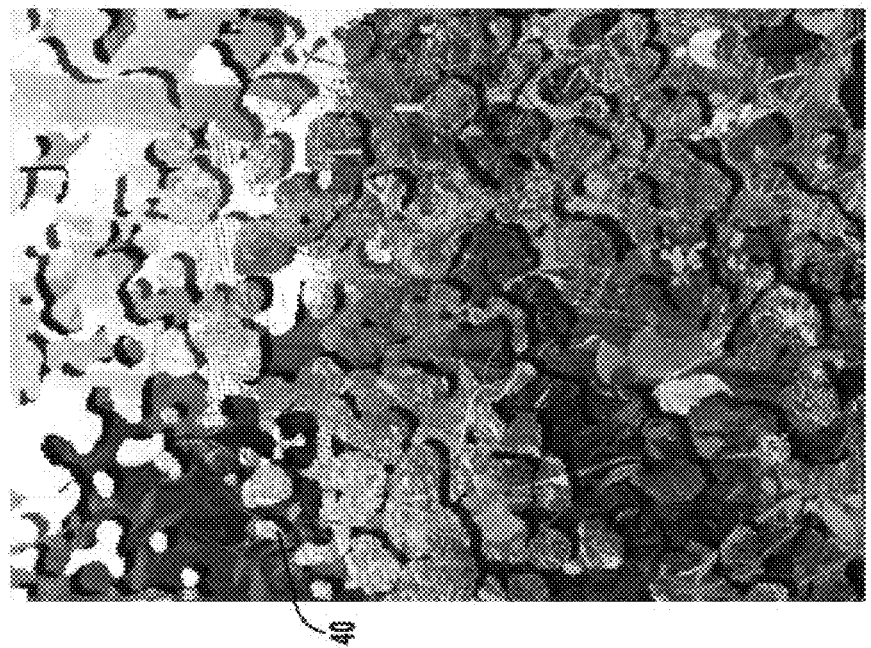
FIG. 13 illustrates the exported image from FIGS. 6-12.

Once the camouflage pattern or design 40 is found to be acceptable as shown in FIG. 13, the mobile smart device software application can digitally display completed camouflage pattern or design along with geo-coordinates, i.e., GPS locations, on the display screen of the mobile smart device. In particular, a GPS device on the mobile smart device can be used to obtain the geo-coordinates associated with the intended operating environment. These geo-coordinates can be assigned to the images used in the camouflage pattern from the operating environment. Using the mobile smart device software application, the newly created camouflage pattern can also be saved to electronic storage on the mobile smart device as a .jpg, .png, or .tiff file by selecting the "Save to Photo Album" button on the display 42 on the interface of the mobile smart device software application shown in FIG. 7.

Figure 11:
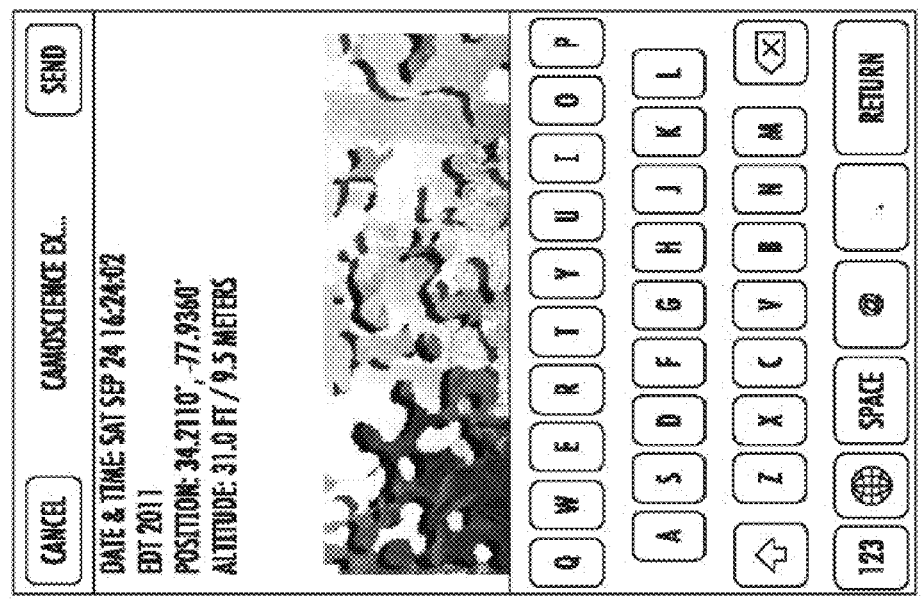
FIGS. 11-12 illustrate an embodiment of an e-mail screen from selecting the "E-mail Pattern" button in FIG. 7 to export the camouflage pattern shown in FIG. 6.
Figure 12:
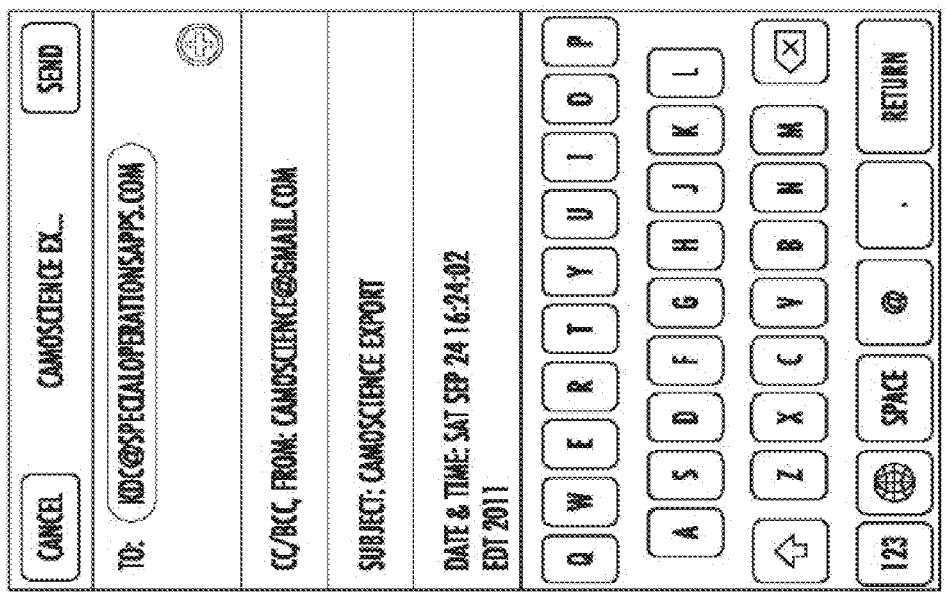
Figure 15:
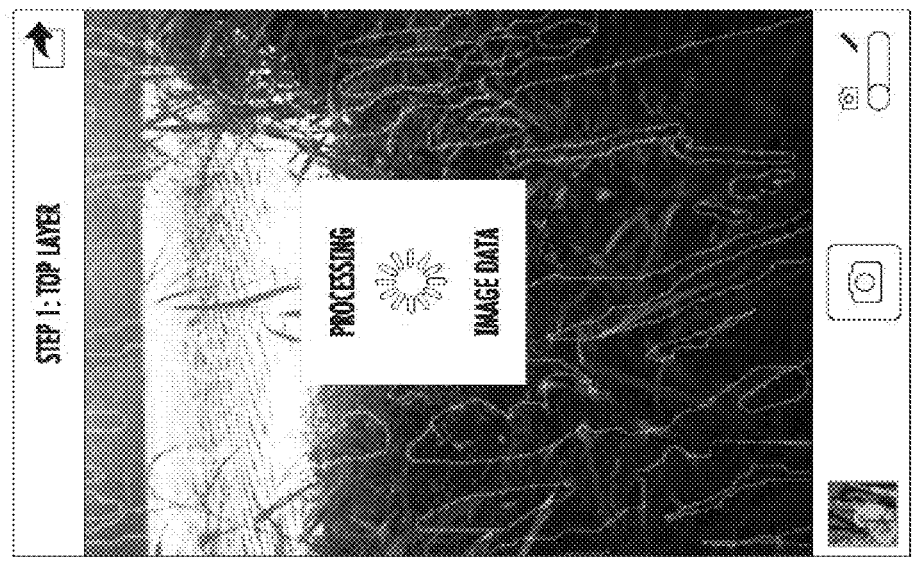
FIG. 15 illustrates an embodiment of an image being processed into a first dispersal mask template layer of the dispersal pattern selected in FIG. 14 according to the present disclosure.
Figure 14:
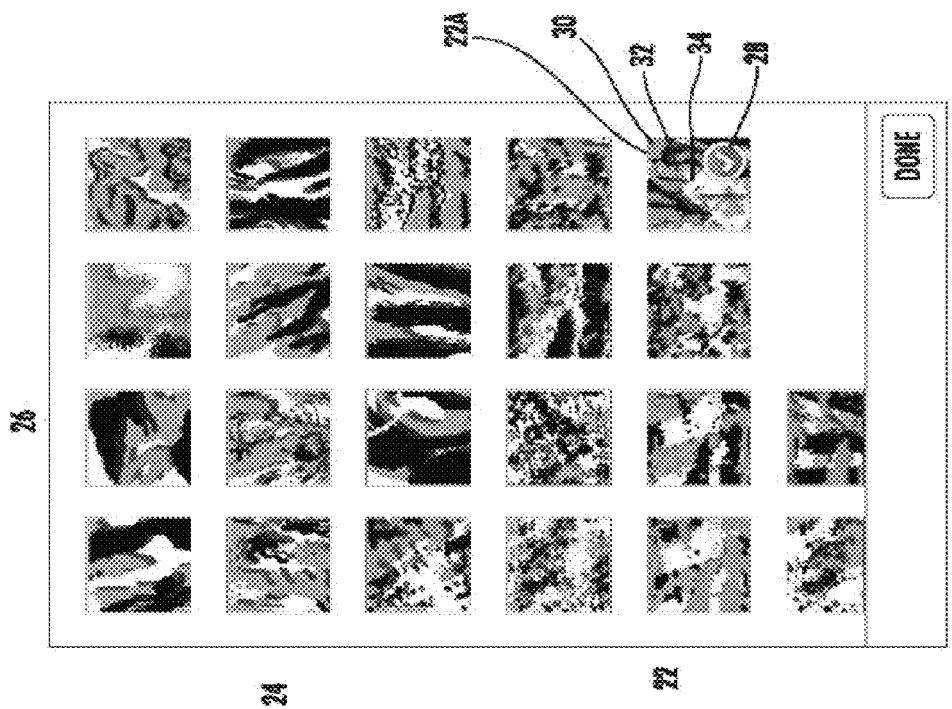
FIG. 14 illustrates an embodiment of a screen shot of a dispersal pattern selection page in the software application according to FIG. 3 on the mobile device that can be used to select a dispersal pattern that can be used to create a camouflage pattern using an image or images from an intended operating environment, such as the images of FIGS. 2A-2C, with the dispersal pattern being capable of being selected by the user and an indication of the selection being provided by an icon, such as a circled check.

Further, the mobile smart device software application can send the newly created camouflage pattern or design along with geo-coordinates, i.e., GPS locations, via electronic communications, to a production facility, for example, to be printed onto a fabric that is then made into a garment using the "E-mail Pattern" button on the display 42 in FIG. 7. The electronic communications that can be used can include emailing or texting from the mobile device via a network, such as, a Wi-Fi, a 4g, or a cloud network as shown in FIGS. 11-12.

If the newly created camouflage pattern is sent electronically to a production facility, it can next be digitally printed onto one or more substrates. For example, the substrates can be woven, nonwoven, and/or knitted fabrics to make coverings using direct-to-fabric, or direct-to-garment materials that can be pre-treated for such a use. Also, in some embodiments, a flame retardant pre-treatment can be used at this stage. The newly created camouflage pattern material or fabric using just-in-time manufacturing/customization processes can be created into a finished product. The finished product can then be shipped to an address designated by the user who sent the camouflage pattern to the production facility. In seine embodiments, the finished product can be transported to the original geographic environments from the coordinates where the imagery was captured with the images or video stream used in the camouflage pattern.

In some embodiments of the software applications, processes and systems, the layer forming steps of the mobile smart device software application can allow the matching and selection of a camouflage pattern color, along with subsection portions from the captured images or video stream. As shown in FIGS. 14-24, a camouflage pattern that incorporates more colored disruptive patterns can be created by having one or more dispersal mask template layers of a dispersal pattern occupied by a color. As above, a dispersal pattern 22A can be chosen from a plurality of dispersal patterns 22, 24, 26 by a touch of the user that is the user's preference for the intended camouflage pattern design and/or based on the features of the intended operating environment in FIG. 14. An indication of the selection can be provided by an icon, such as a circled check 28. Each dispersal pattern, such as template 22A in FIG. 14, can have multiple dispersal mask template layers 30, 32, 34 that can each be used to add distorting and/or disruptive features to the camouflage pattern being created when the multiple layers 30, 32, 34 are combined. As in FIG. 15, a portion of an image after selection of the dispersal pattern according to FIG. 14 with a shadow (i.e., outline) of the intended dispersal pattern over the original image. The portion of the image can serve as a dispersal mask template layer and can be processed to occupy that dispersal mask template layer. In some embodiments, the dispersal pattern shadow can serve as a view finder to optimize the image being used.

Figure 17:
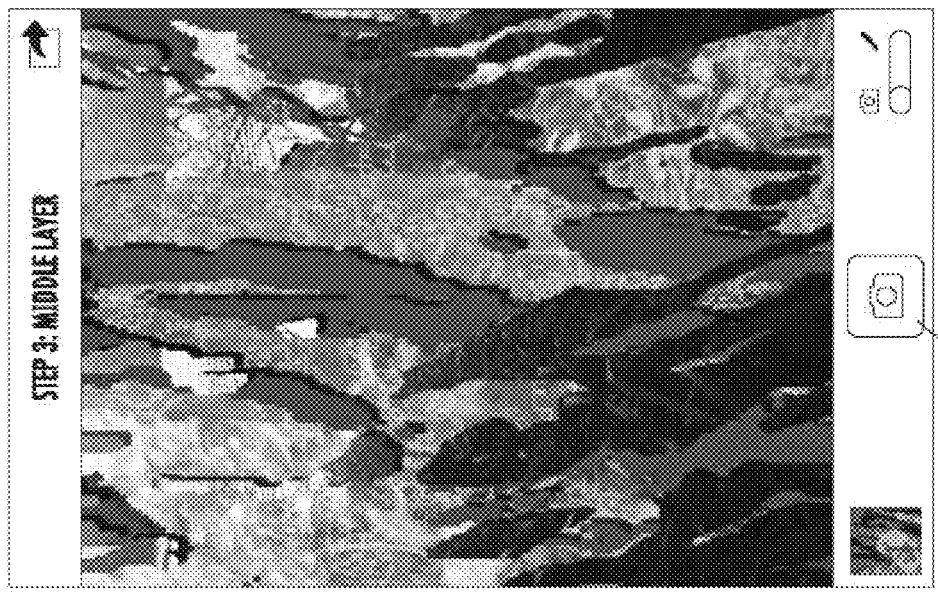
FIGS. 16-18 illustrate using color palettes (i.e., paintbrush icon) and/or photographic images (i.e., camera icon) to add color or subsections of images to other layers of the dispersal pattern to create a camouflage pattern according to the subject matter disclosure herein.
Figure 16:
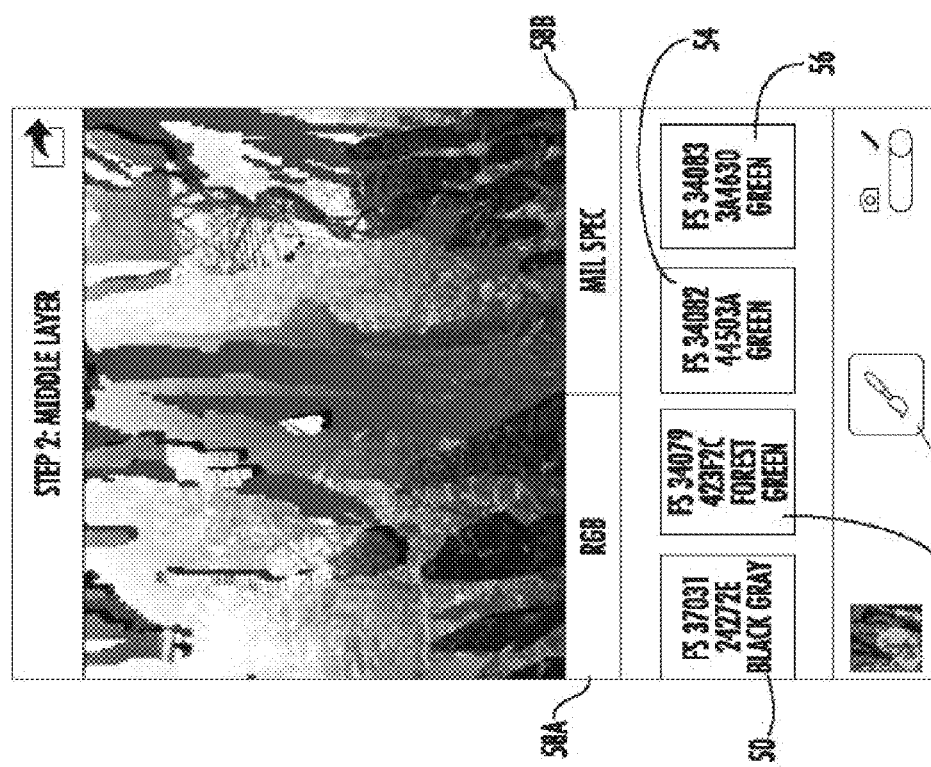
Figure 18:
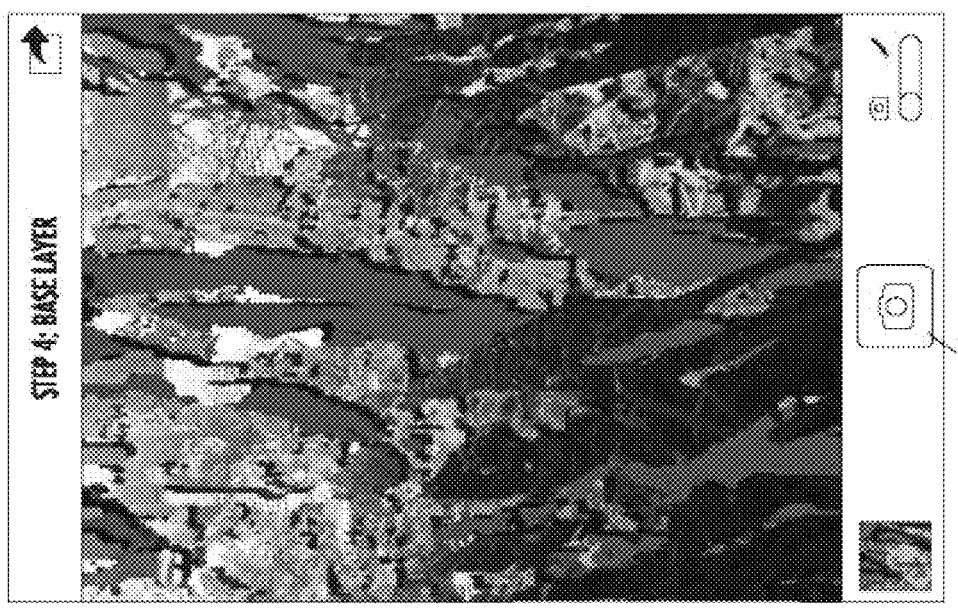

As shown in FIG. 16, colors selected from recommended colors 60, 52, 64, 56 of one or more color range systems 58A, 68B using an specified icon 60, such as the paintbrush icon. The color range systems can be, for example, an RBG color range system 68A or a milspec color range system 58B. The selected colors can be used to occupy other dispersal mask template layers until a camouflage pattern 70 is completed. Alternatively, some dispersal mask template layers can be occupied by images by using a camera icon 62 as shown in FIGS. 17 and 18. As above, in some embodiments, each dispersal layer can be chosen and captured through the shadow view finder so that the camouflage pattern builds in with each new captured image occupying one of the dispersal mask template layers of the chosen dispersal pattern.

Figure 19:
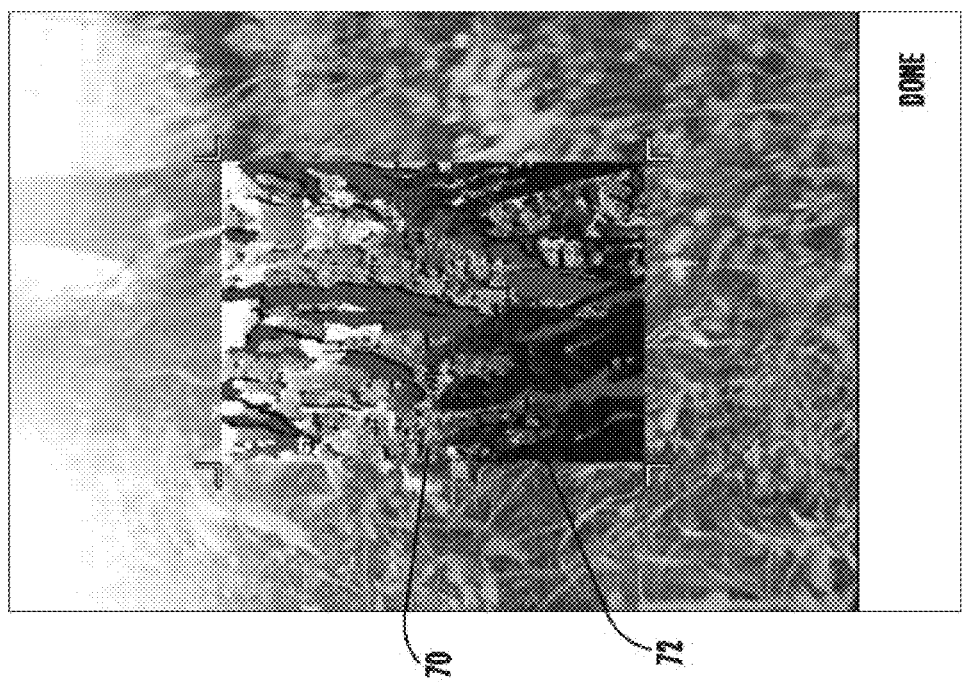
FIGS. 19-20 illustrate the completed camouflage pattern design according to FIGS. 14-18 in the "Live Preview" feature from the activation of the "Live Preview" button in FIG. 10 shown against different areas within the intended operating environment.
Figure 20:
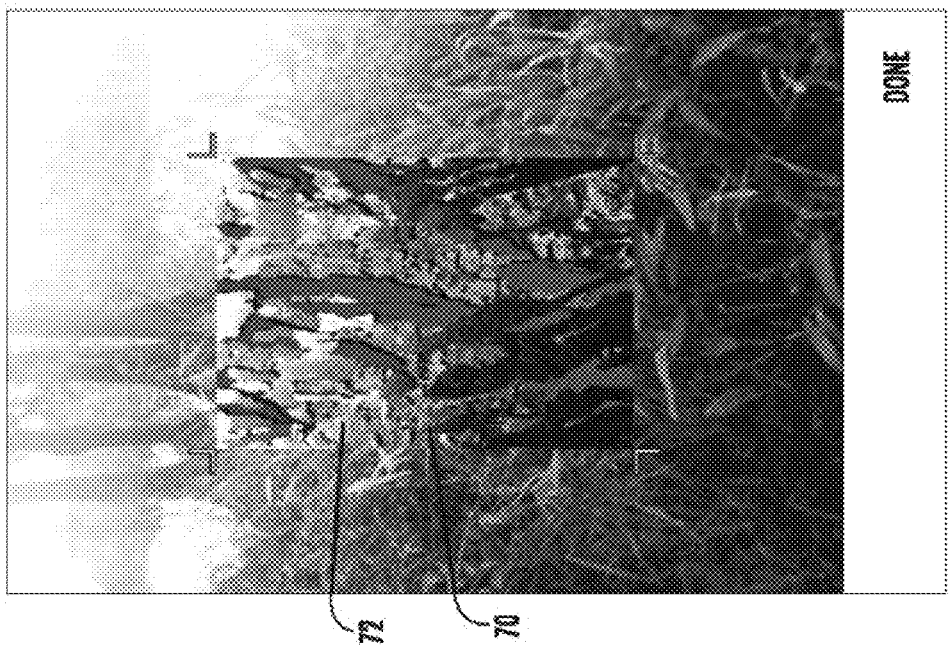

The mobile smart device software application can include an augmented reality function. Using the augmented reality function, labeled as "Live Preview" on display 42 as shown in FIG. 7, the intended newly created camouflage design can be displayed onto the viewfinder of the mobile device to test how well it works as shown in FIGS. 19 and 20. To confirm the camouflage patterns effectiveness or usefulness, the mobile smart device software application can display on the mobile smart device a design thumbnail 72 of the newly created camouflage pattern 70 against a live or recorded image or video steam through the (as shown in FIGS. 8-10). Using the image taking device on the mobile smart device, the mobile smart device can then be pointed into multiple areas of the intended operating environment for comparison. If necessary, a user can select the start over feature (as shown in FIG. 7), if the user wishes to improve the newly created camouflage pattern or design.

Figure 21:
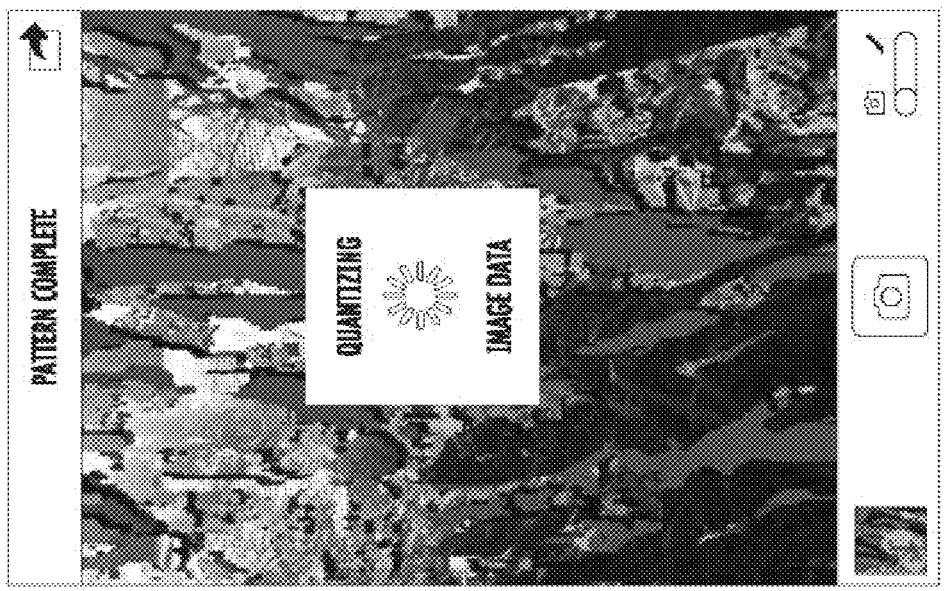
FIG. 21 illustrates the completed camouflage pattern design according to FIGS. 19 and 20 in the "Quantizing Color" feature generated from selecting the "Quantizing Color" button in FIG. 10.

After a camouflage pattern is completed an options button display 42 can be activated as shown in FIG. 7. In some embodiments, the mobile smart device software application can then shift the entire newly created camouflage design or at a portion thereof into a color range system such as milspec color range system of milspec colors through selecting the "quantize colors" feature button feature on display 42 in the mobile smart device software application on the mobile device as shown in FIG. 7. In particular, as shown in FIG. 21 the software application a processes the colors to find milspec colors that are closest to the colors in the pattern to replace the colors in the camouflage with that milspec color. In this manner, military camouflage and, in some cases, more printer friendly camouflage can be created from the intended operating environment. For example, a camouflage pattern color from the captured image can be matched with colors from a color range system. Such a color range system can comprise at least one of a milspec color system or an RBG color system This color can be, for example, a milspec color. Different dispersal patterns can be used to create a site-specific, i.e., geo-location based camouflage in different manners, for example, as explained in U.S. patent application Ser. No. 12/221,540, incorporated by reference herein in its entirety.

Figure 23:
FIG. 23 illustrates the completed camouflage design in milspec colors in the "Live Preview" feature from FIG. 10 shown against different area within the intended operating environment.
Figure 22:
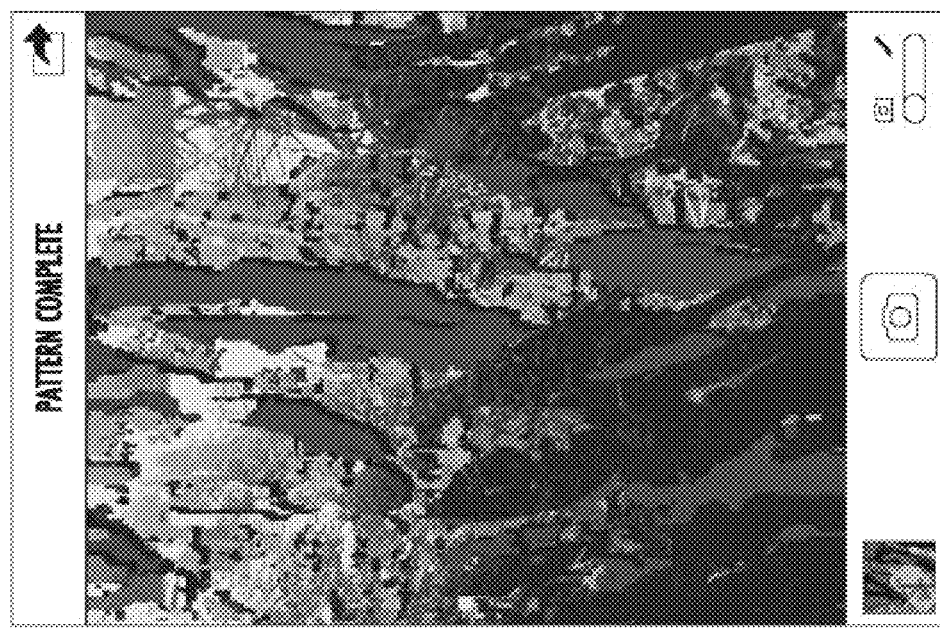
FIG. 22 illustrates the completed camouflage pattern design according to FIGS. 20 and 21 in the "Quantizing Color" feature from selecting the "Quantizing Color" button in FIG. 10 when the milspec button is selected in FIG. 16 and the colors are in milspec color.
Figure 24:
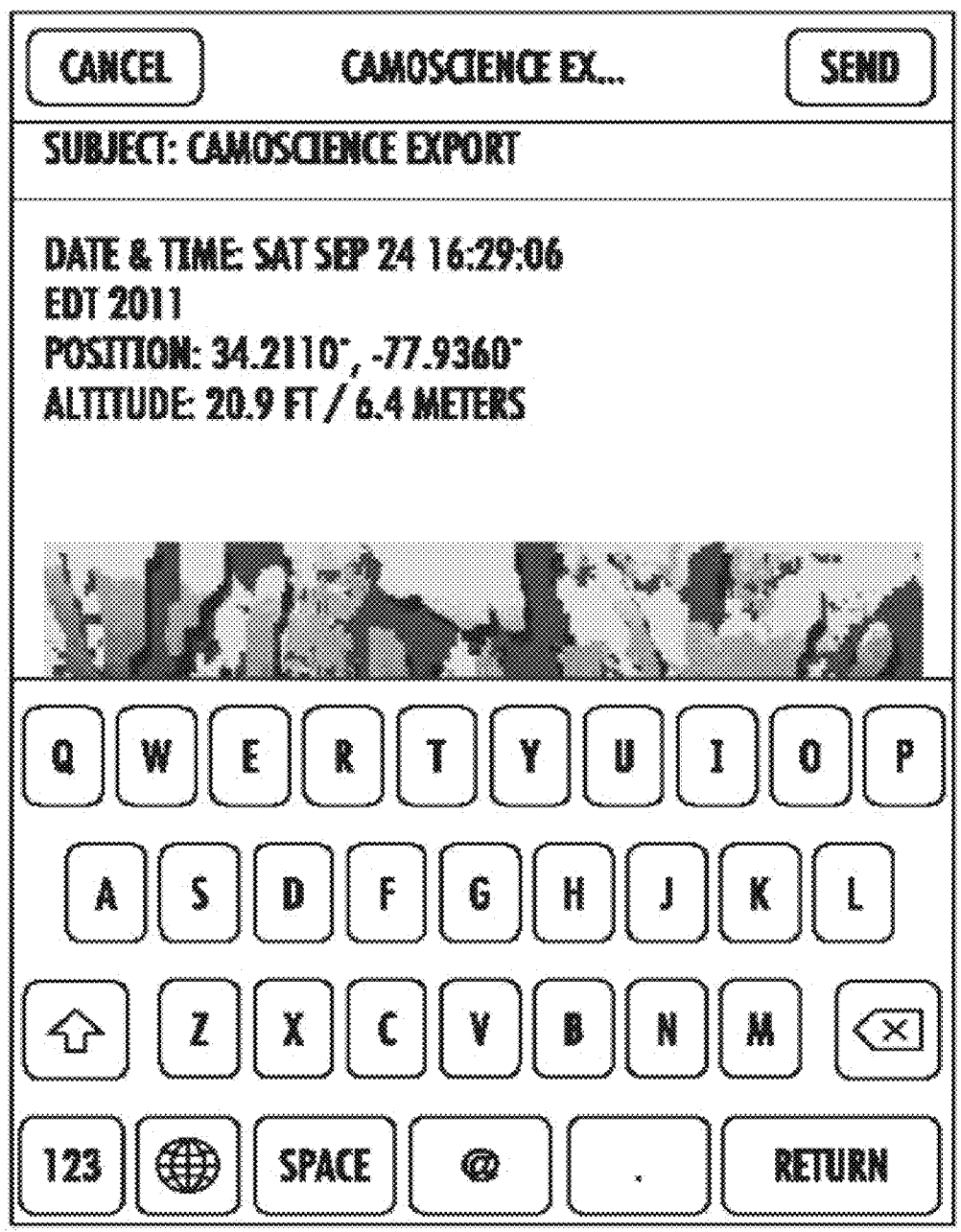
FIG. 24 illustrates an embodiment of the e-mail screen from selecting the "E-mail Pattern" button in FIG. 10 to export the camouflage pattern design shown in FIGS. 22 and 23.

Once the camouflage pattern or design 70 after quantizing the color in FIG. 22 is found to be acceptable after inspection in FIG. 23, can saved or email as shown in FIG. 24 as described above.

These steps outlined above are provided as an example. Other processes, systems, and computer program products can be used to create visual designs and arrangements that originate from an image or images from a video stream that deviate from, augment, or enhance the steps described above.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:
1. A mobile device comprising:
    an image capturing module for capturing an image with the mobile device;
    a memory; and
    a processor configured for:

processing the captured image to occupy a selected dispersal mask template layer of a dispersal pattern that comprises multiple dispersal mask template layers by filling boundaries outlined by the selected dispersal mask template layer with portions of the captured image; and filling the other layers of the multiple dispersal mask template layers of the dispersal pattern by filling boundaries outlined by the other dispersal mask template layers with at least one of colors, images, or subsections of one or more images to form a camouflage pattern.

2. The mobile device according to claim 1, wherein filling the other layers of the multiple dispersal mask template layers of the dispersal pattern comprises processing multiple captured images to occupy at least some of the other layers of the multiple dispersal mask template layers of the dispersal pattern, with each captured image occupying a layer of the other layers of the multiple layers.

3. The mobile device according to claim 1, wherein filling the other layers of the multiple dispersal mask template layers of the dispersal pattern comprises occupying at least some of the other layers of the multiple dispersal mask template layers of the dispersal pattern with one or more colors.

4. The mobile device according to claim 1, wherein the captured image comprises an image of an intended operating environment of a camouflaging material to be applied to an object.

5. The mobile device according to claim 4, wherein the processor is further configured for obtaining geo-location data associated with the intended operating environment and assigning the geo-location data to the captured image and the camouflage pattern.

6. The mobile device according to claim 5, wherein the processor is further configured for digitally displaying the completed camouflage pattern along with geo-coordinates on a display screen of the mobile device.

7. The mobile device according to claim 1, wherein the processor is further configured for quantizing the colors in the camouflage pattern and replacing the colors in the camouflage pattern with colors from a color range system closest to the colors in a subsection of the capture image.

8. The mobile device according to claim 7, wherein the color range system comprises at least one of a milspec color system or an RBG color system.

9. The mobile device according to claim 1, wherein the processor is further configured for providing an augmented reality function to compare the formed camouflage pattern to the intended operating environment by displaying a thumbnail of the camouflage pattern on real time images of an operating environment on a display screen of the mobile device.

10. The mobile device according to claim 1, wherein the processor is further configured for sending the created camouflage pattern via electronic communications to a production facility for printing the created camouflage pattern on a substrate.

11. A method comprising:
capturing an image with an imaging module of a mobile device;

processing the captured image to occupy a selected dispersal mask template layer of a dispersal pattern that comprises multiple dispersal mask template layers by filling boundaries outlined by the selected dispersal mask template layer with portions of the captured image; and filling the other layers of the multiple dispersal mask template layers of the dispersal pattern by filling boundaries outlined by the other respective dispersal mask template layers with at least one of colors, images, or subsections of one or more images to form a camouflage pattern.

12. The method according to claim 11, wherein filling the other layers of the multiple dispersal mask template layers of the dispersal pattern comprises processing multiple captured images to occupy at least some of the other layers of the multiple dispersal mask template layers of the dispersal pattern, with each captured image occupying a layer of the other layers of the multiple layers.

13. The method according to claim 11, wherein filling the other layers of the multiple dispersal mask template layers of the dispersal pattern comprises occupying at least some of the other layers of the multiple dispersal mask template layers of the dispersal pattern with one or more colors.

14. The mobile device according to claim 11, wherein the captured image comprises an image of the intended operating environment of a camouflaging material to be applied to an object.

15. The mobile device according to claim 14, further including obtaining geo-location data associated with the intended operating environment and assigning the geo-location data to the captured image and the camouflage pattern.

16. The mobile device according to claim 15, further including digitally displaying the completed camouflage pattern along with geo-coordinates on a display screen of the mobile device.

17. The mobile device according to claim 11, further including quantizing the colors in the camouflage pattern and replacing the colors in the camouflage pattern with colors from the color range system closest to the colors in the subsection of the capture image.

18. The mobile device according to claim 17, wherein the color range system comprises at least one of a milspec color system or an RBG color system.

19. The mobile device according to claim 11, further including providing an augmented reality function to compare the formed camouflage pattern to the intended operating environment by displaying a thumbnail of the camouflage pattern on real time images of an operating environment on a display screen of the mobile device.

20. The mobile device according to claim 11, further including sending the created camouflage pattern via electronic communications to a production facility for printing the created camouflage pattern on a substrate.

* * * * *